US012504941B2

(12) United States Patent
Young et al.

(10) Patent No.: US 12,504,941 B2
(45) Date of Patent: Dec. 23, 2025

(54) CONFIGURATION OF AUDIO FOR VOICE TEST SYSTEM AUTOMATION

(71) Applicant: Hand Held Products, Inc., Charlotte, NC (US)

(72) Inventors: Bernard Young, Pittsburgh, PA (US); Brian Manuel, Gibsonia, PA (US)

(73) Assignee: HAND HELD PRODUCTS, INC., Charlotte, NC (US)

(*) Notice: Subject to any disclaimer, the term of this patent is extended or adjusted under 35 U.S.C. 154(b) by 294 days.

(21) Appl. No.: 18/056,503

(22) Filed: Nov. 17, 2022

(65) Prior Publication Data

US 2024/0168702 A1  May 23, 2024

(51) Int. Cl.
G06F 3/16 (2006.01)

(52) U.S. Cl.
CPC .............. *G06F 3/162* (2013.01); *G06F 3/167* (2013.01)

(58) Field of Classification Search
CPC ......... G06F 16/683; G06F 16/60; G06F 3/167
USPC .......................................................... 700/94
See application file for complete search history.

(56) References Cited

U.S. PATENT DOCUMENTS

| | | | |
|---|---|---|---|
| 8,200,527 B1 * | 6/2012 | Thompson .............. | G06Q 30/00 705/7.41 |
| 11,581,099 B1 * | 2/2023 | Rufo ....................... | G16H 20/13 |
| 2008/0144847 A1 | 6/2008 | Chen et al. | |
| 2013/0156207 A1 * | 6/2013 | Visser ...................... | H04B 7/26 381/80 |
| 2014/0270282 A1 * | 9/2014 | Tammi ..................... | H04R 5/02 381/300 |
| 2014/0294201 A1 * | 10/2014 | Johnson ................... | H03G 99/00 381/107 |
| 2015/0149301 A1 * | 5/2015 | Dow ........................ | G06Q 30/0273 705/14.69 |
| 2016/0092805 A1 | 3/2016 | Geisler et al. | |
| 2016/0117627 A1 * | 4/2016 | Raj .......................... | G06Q 10/06398 705/7.42 |

(Continued)

FOREIGN PATENT DOCUMENTS

| | | |
|---|---|---|
| CN | 100558123 C | 11/2009 |
| EP | 4080371 A1 | 10/2022 |

OTHER PUBLICATIONS

Extended European Search Report Mailed on Apr. 15, 2024 for EP Application No. 23206054, 8 page(s).

*Primary Examiner* — Alexander Krzystan
(74) *Attorney, Agent, or Firm* — Alston & Bird LLP

(57) ABSTRACT

Various embodiments described herein provide for configuration of audio for voice test system automation. In this regard, audio prompt data is output via at least one sound card from a set of sound cards integrated within an execution device in response to establishing a connection with a mobile device. In response to the audio prompt data being output via the at least one sound card, at least mobile device data is received from the mobile device. The mobile device data may be generated in response to recognition of particular audio prompt data output via the at least one sound card. Additionally, the mobile device data is correlated with sound card data that corresponds to information related to the at least one sound card. The sound card data in connection with the mobile device data is also encoded into a database associated with voice test automation for a voice system that facilitates workflow tasks for a user related to the mobile device.

20 Claims, 7 Drawing Sheets

(56) References Cited

U.S. PATENT DOCUMENTS

| | | | | |
|---|---|---|---|---|
| 2016/0337771 A1* | 11/2016 | Di Censo | ................ | H04S 7/301 |
| 2018/0342329 A1* | 11/2018 | Rufo | ...................... | G16H 40/67 |
| 2020/0103513 A1* | 4/2020 | Knaappila | .............. | H04B 17/27 |
| 2020/0359153 A1* | 11/2020 | Tu | ........................... | H04S 1/007 |
| 2024/0061759 A1 | 2/2024 | Ma | | |

* cited by examiner

CONFIGURATION OF AUDIO FOR VOICE TEST SYSTEM AUTOMATION

TECHNICAL FIELD

The present disclosure relates generally to voice technology systems, and more particularly to a voice technology system configured for voice-guided workflows.

BACKGROUND

Mobile computing technology related to mobile devices, wearable devices, augmented realty devices, virtual reality devices, and/or other mobile computing technology are being increasingly employed in material handling environments, as well as other types of environments. Mobile computing technology can provide users with mobility while also providing the user with desirable computing, data collection, data processing functions, and/or data analytics. Such mobile computing technology also often provides a communication link to a server computer system. For example, mobile computing technology related to a warehouse system can provide a user with data associated with product distribution and tracking, product inventory management, etc. However, inefficiencies are often introduced during configuration of a mobile computing system and/or a server computer system for such mobile computing technologies.

BRIEF SUMMARY

In accordance with an embodiment of the present disclosure, a system comprises a processor and a memory. The memory stores executable instructions that, when executed by the processor, cause the processor to, in response to establishing a connection with a mobile device, output audio prompt data via at least one sound card from a set of sound cards integrated within an execution device. The executable instructions, when executed by the processor, also cause the processor to, in response to the audio prompt data being output via the at least one sound card, receive at least mobile device data from the mobile device. In one or more embodiments, the mobile device data is generated in response to recognition of particular audio prompt data output via the at least one sound card. The executable instructions, when executed by the processor, also cause the processor to correlate the mobile device data with sound card data that corresponds to information related to the at least one sound card. The executable instructions, when executed by the processor, also cause the processor to encode the sound card data in connection with the mobile device data into a database associated with voice test automation for a voice system that facilitates workflow tasks for a user related to the mobile device.

In accordance with another embodiment of the present disclosure, a method is provided. In one or more embodiments, the method is a computer-implemented method. The method provides for outputting audio prompt data via at least one sound card from a set of sound cards integrated within an execution device in response to establishing a connection with a mobile device. In response to the audio prompt data being output via the at least one sound card, the method also provides for receiving at least mobile device data from the mobile device. In one or more embodiments, the mobile device data is generated in response to recognition of particular audio prompt data output via the at least one sound card. The method also provides for correlating the mobile device data with sound card data that corresponds to information related to the at least one sound card. The method also provides for encoding the sound card data in connection with the mobile device data into a database associated with voice test automation for a voice system that facilitates workflow tasks for a user related to the mobile device.

In accordance with yet another embodiment of the present disclosure, a computer program product is provided. The computer program product comprises at least one computer-readable storage medium having program instructions embodied thereon, the program instructions executable by a processor to cause the processor to, in response to establishing a connection with a mobile device, output audio prompt data via at least one sound card from a set of sound cards integrated within an execution device. The program instructions are also executable by the processor to cause the processor to, in response to the audio prompt data being output via the at least one sound card, receive at least mobile device data from the mobile device. In one or more embodiments, the mobile device data is generated in response to recognition of particular audio prompt data output via the at least one sound card. The program instructions are also executable by the processor to cause the processor to correlate the mobile device data with sound card data that corresponds to information related to the at least one sound card. The program instructions are also executable by the processor to cause the processor to encode the sound card data in connection with the mobile device data into a database associated with voice test automation for a voice system that facilitates workflow tasks for a user related to the mobile device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
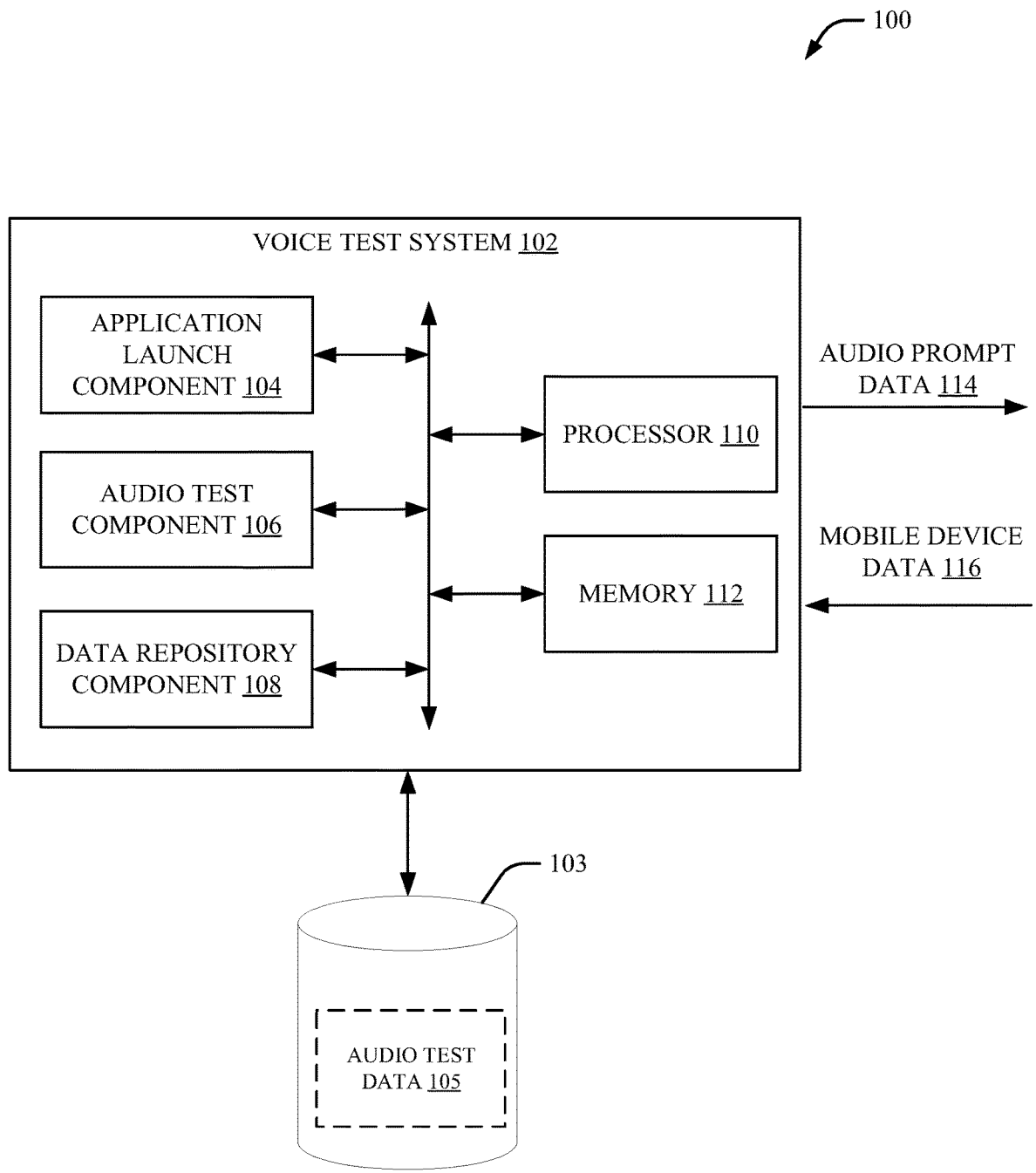
FIG. 1 illustrates an exemplary system for configuring audio for an audio test via a voice test system, in accordance with one or more embodiments described herein.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Mobile computing technology related to mobile device, wearable devices, augmented realty devices, virtual reality devices, and/or other mobile computing technology are being increasingly employed in material handling environments, as well as other environments related to manufacturing, factories, production, warehouses, distribution centers, shipping centers, access control, transportation and logistics, etc. Mobile computing technology can provide users with mobility while also providing the user with desirable computing, data collection, data processing functions, and/or data analytics. Such mobile computing technology also often provides a communication link to a server computer system. For example, mobile computing technology related to a warehouse execution system (WES), a warehouse management system (WMS), a warehouse control system (WCS), and/or another type of warehouse system can provide a user with data associated with product distribution and tracking, product inventory management, etc. However, inefficiencies are often introduced during configuration of a mobile computing system and/or a server computer system for such mobile computing technologies.

Moreover, certain types of mobile computing technology employ a voice system to facilitate workflow tasks for a user. For example, a WES associated with warehouse workflow execution can employ a voice system to provide a user with data associated with warehouse workflows and/or other workflow tasks. Execution of a voice-based workflow generally consists of alternating series of prompts from a voice system and responses from users, where content of each prompt depends upon the last response received from the user. Once a prompt is provided, text data corresponding to the prompt can be converted into a digital audio waveform. For example, text data corresponding to the prompt can be converted into a digital audio waveform by a text-to-speech process.

However, configuring a mobile computing system generally involves manual configuration of a connection between a sound card of an execution device that manages a voice test for a mobile computing system configured to facilitate workflow tasks for a user. As such, a mobile computing system and/or an execution device may inefficiently consume processing resources until the mobile computing system is properly configured to facilitate workflow tasks for a user. Additionally or alternatively, one or more other inefficiencies related to computing resources and/or memory usage may be introduced during configuration of a mobile device for facilitating workflow tasks for a user. It is therefore desirable to reduce computing resources and/or other inefficiencies for a mobile device, a mobile computing system and/or an execution device during a voice test for the mobile computing system.

Thus, to address these and/or other issues, various embodiments disclosed herein provide for configuration of audio for voice test system automation. In various embodiments, automation configuration of speech data for a voice test automation process can be provided. The voice test automation process can be executed via a voice test automation lab environment and/or another type of environment associated with material handling, manufacturing, a factory, production, a warehouse, a distribution center, a shipping center, access control, transportation and logistics, etc. In one or more embodiments, configuration of a mobile computing system (e.g., a mobile device system) can be provided via the voice test automation process. The mobile computing system can correspond to or can be integrated within a mobile device, a wearable device, a tablet device, an augmented realty device, a virtual reality device, and/or other type of device configured as a user audio device. Additionally, the voice test automation process can allow the mobile computing system to be configured for communication with a server computer system in less amount of time and/or by employing less computing resources as compared to traditional configuration techniques for configuring a mobile computing system and/or a server computer system. A number of test failures due to misconfigured speech settings for a mobile computing system can also be reduced.

In one or more embodiments, a first application executed on an execution device can detect when a mobile device is communicatively coupled to the execution device via a communication channel. The execution device can be a personal computer, a laptop computer, a workstation computer, a server computer, or another type of execution device configured with sound cards. The communication channel can be a wireless communication channel or a wired communication channel. Additionally, a second application executed via the mobile device can be launched in response to the mobile device being communicatively coupled to the execution device. In various embodiments, the second application on the mobile device can be launched based on an identifier associated with the execution device and/or the first application. In response to the second application being launched and/or the mobile device being communicatively coupled to the execution device, the first application on the execution device can be configured to identify respective sound cards of the execution device. Additionally, the first application on the execution device can be configured to output audio from the respective sound cards to identify a sound card compatible with the mobile device. The first application on the execution device can be configured to sequentially output audio from the respective sound cards. For example, the first application on the execution device can be configured to initially output audio from a first sound card of the execution device, then output the audio from a second sound card of the execution device in response to the audio no longer being output from the first sound card, etc.

In one or more embodiments, the mobile device can receive audio provided by the respective sound cards via one or more microphones of the mobile device. Additionally, the second application of the mobile device can generate mobile device data (e.g., a mobile device identifier, other information related to the mobile device, and/or an acknowledgement response) in response to audio provided by a particular sound card. The mobile device data can be generated by the second application of the mobile device in response to a determination that the audio provided by the particular sound card is recognized. Additionally or alternatively, in response to receiving the mobile device data, the first application of the execution device can correlate the mobile device data with sound card data related to the particular sound card. The sound card data can include a sound card identifier, a text to speech (TTS) rate, a volume level, a voice identifier related to identification of a digitized voice associated with the audio provided by the particular sound card, a prompt identifier related to identification of a type of prompt in the audio provided by the particular sound card, and/or other sound card data. Accordingly, based on the mobile device data, the first application of the execution device can identify and/or configure the particular sound card for the mobile device. Additionally or alternatively, based on the mobile device data, the first application of the execution device can update a database with one or more portions of the sound card data in connection with the mobile device data. Accordingly, performance of the mobile device can be improved to achieve desirable computing, data collection, data processing functions, and/or data analytics related to providing workflow tasks for a user.

FIG. 1 illustrates an exemplary embodiment of a system 100 within which one or more described features of one or more embodiments of the disclosure can be implemented. The system 100 includes a voice test system 102 and a data repository 103. In one or more embodiments, the voice test system 102 can be configured to perform one or more voice test automation processes to configure audio processing related to one or more workflow tasks. In various embodiments, the voice test system 102 can configure a mobile device system (e.g., mobile device system 202 illustrated in FIG. 2) integrated within a mobile device, a wearable device, a tablet device, an augmented realty device, a virtual reality device, and/or other type of device configured as a user audio device. For example, the voice test system 102 can configure a mobile computing system (e.g., a voice system) configured to provide one or more user audio devices with data associated with warehouse workflows and/or other workflow tasks.

In various embodiments, the voice test system 102 can interface with or can be implemented on an execution device such as, but not limited to, a personal computer, a laptop computer, a workstation computer, a server computer, or another type of execution device configured with sound cards. In certain embodiments, a workflow task can provide information related to one or more products or other items handled in a voice-directed work environment. In one or more embodiments, the voice test system 102 can be associated with a WES, WMS, WCS, and/or another type of warehouse system associated with warehouse workflows, product distribution and tracking, product inventory management, etc.

In various embodiments, the data repository 103 can be configured to store audio test data 105. At least a portion of the audio test data 105 can include sound card data correlated with mobile device data. In an embodiment, the data repository 103 can be configured separate from the voice test system 102 and/or can be in communication with the voice test system 102. In an alternate embodiment, the data repository 103 can be integrated into the voice test system 102. In certain embodiments, at least a portion of the memory 112 can be allocated for the data repository 103. In certain embodiments, the data repository 103 can be configured as a database for the voice test system 102.

The voice test system 102 includes an application launch component 104, an audio test component 106 and/or a data repository component 108. Additionally, in certain embodiments, the voice test system 102 can include a processor 110 and/or a memory 112. In certain embodiments, one or more aspects of the voice test system 102 (and/or other systems, apparatuses and/or processes disclosed herein) can constitute executable instructions embodied within a computer-readable storage medium (e.g., the memory 112). For instance, in an embodiment, the memory 112 can store computer executable component and/or executable instructions (e.g., program instructions). Furthermore, the processor 110 can facilitate execution of the computer executable components and/or the executable instructions (e.g., the program instructions). In an example embodiment, the processor 110 can be configured to execute instructions stored in the memory 112 or otherwise accessible to the processor 110.

The processor 110 can be a hardware entity (e.g., physically embodied in circuitry) capable of performing operations according to one or more embodiments of the disclosure. Alternatively, in an embodiment where the processor 110 is embodied as an executor of software instructions, the software instructions can configure the processor 110 to perform one or more algorithms and/or operations described herein in response to the software instructions being executed. In an embodiment, the processor 110 can be a single core processor, a multi-core processor, multiple processors internal to the voice test system 102, a remote processor (e.g., a processor implemented on a server), and/or a virtual machine. In certain embodiments, the processor 110 can be in communication with the memory 112, the application launch component 104, the audio test component 106 and/or the data repository component 108 via a bus to, for example, facilitate transmission of data among the processor 110, the memory 112, the application launch component 104, the audio test component 106 and/or the data repository component 108. The processor 110 can be embodied in a number of different ways and can, in certain embodiments, include one or more processing devices configured to perform independently. Additionally, or alternatively, the processor 110 can include one or more processors configured in tandem via a bus to enable independent execution of instructions, pipelining of data, and/or multi-thread execution of instructions. The memory 112 can be non-transitory and can include, for example, one or more volatile memories and/or one or more non-volatile memories. In other words, for example, the memory 112 can be an electronic storage device (e.g., a computer-readable storage medium). The memory 112 can be configured to store information, data, content, one or more applications, one or more instructions, or the like, to enable the voice test system 102 to carry out various functions in accordance with one or more embodiments disclosed herein. As used herein in this disclosure, the term "component," "system," "device," and the like, can be and/or can include a computer-related entity. For instance, "a component," "a system," "a device," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

The application launch component 104 can initiate a voice test automation process via the mobile device system in response to a connection being established between the mobile device system and the voice test system 102. For example, the application launch component 104 can launch an application on the mobile device system in response to a connection being established between the mobile device system and the voice test system 102. The application on the mobile device system can be configured to perform the voice test automation process in connection with the voice test system 102. The connection can be a wireless connection that communicatively couples the mobile device system and the voice test system 102 via one or more wireless communication channels. The wireless connection can be associated with Bluetooth, Near Field Communication (NFC), or any other type of communication protocol. Alternatively, the connection can be a wired connection that communicatively couples the mobile device system and the voice test system 102 via one or more wired communication channels. In various embodiments, the application launch component 104 can transmit an execution device identifier to the mobile device system to initiate the voice test automation process via the mobile device system in response to establishing the connection with the mobile device system. The execution device identifier can correspond to the execution device associated with the voice test system 102. Additionally or alternatively, the application launch component 104 can transmit one or more control signals to the mobile device system to initiate the voice test automation process via the mobile device system in response to establishing the connection with the mobile device system.

The audio test component 106 can be configured to manage the voice test automation process related to the mobile device system. In various embodiments, the audio test component 106 can execute one or more subprocesses related to the voice test automation process. For example, the audio test component 106 can output audio prompt data 114 via respective sound cards from a set of sound cards integrated within the execution device in response to establishing the connection with the mobile device system. In one or more embodiments, the audio test component 106 can sequentially output the audio prompt data 114 via the respective sound cards in response to establishing the connection with the mobile device system. For example, the audio test component 106 can output the audio prompt data 114 via a first sound card from the set of sound cards in response to establishing the connection with the mobile device system. Additionally, the audio test component 106 can output the audio prompt data 114 via at least a second sound card from the set of sound cards in response to the audio prompt data being successfully output from the first sound card. The audio prompt data 114 can include audio data, voice data, audio test data, TTS data, workflow task data, instruction data, training data, audio waveform data, audio file data, and/or other audio prompt data. The audio included in the audio prompt data 114 can be audio capable of being recognized by the mobile device system. In certain embodiments, the audio prompt data 114 includes one or more sounds capable of being recognized by the mobile device system. In certain embodiments, the audio prompt data 114 includes audio related to one or more words and/or one or more phrases capable of being recognized by the mobile device system. In certain embodiments, the audio prompt data 114 can include audio data (e.g., voice data) related to one or more workflow tasks such as one or more warehouse workflows and/or one or more warehouse workflow tasks.

In response to the audio prompt data 114 being output via the respective sound cards, the audio test component 106 can receive at least mobile device data 116 from the mobile device system. The mobile device data 116 can be generated by the mobile device system in response to recognition of the audio prompt data 114. Additionally, the mobile device data 116 can correspond to information related to the mobile device system and/or a mobile device that includes the mobile device system. For example, the mobile device data 116 can include a mobile device identifier associated with the mobile device system, an application identifier associated with the application executed via the mobile device system, a voice test identifier associated with a type of voice test related to the voice test automation process, and/or other data associated with the mobile device system. In certain embodiments, the mobile device data 116 can include and/or can be configured as audio response data that provides an acknowledgement indicator related to recognition of the audio prompt data 114. However, it is to be appreciated that the mobile device data 116 can additionally or alternatively include other information related to the mobile device system and/or a mobile device that includes the mobile device system.

In one or more embodiments, the audio test component 106 can be configured to correlate the mobile device data 116 with sound card data that corresponds to information related to a sound card (e.g., a particular sound card) from the set of sound cards that provided a particular version of the audio prompt data 114 recognized by the mobile device system. The sound card data can include a sound card identifier associated with a sound card that provided the particular version of the audio prompt data 114 recognized by the mobile device system, text to speech data associated with the particular version of the audio prompt data 114 output via the sound card, volume data associated with the particular version of the audio prompt data 114 output via the sound card, identifier data associated with the particular version of the audio prompt data 114 output via the sound card, mobile device data associated with the mobile device system, and/or other data. In one or more embodiments, the text to speech data can include at least a text to speech rate associated with the particular version of the audio prompt data 114 output via the sound card. In one or more embodiments, the volume level can include at least a volume level associated with the particular version of the audio prompt data 114 output via the sound card. In one or more embodiments, the identifier data can include a voice identifier for a digitized voice associated with the particular version of the audio prompt data 114 output via the sound card, a prompt identifier associated with a type of audio prompt for the particular version of the audio prompt data 114 output via the sound card, an audio port identifier associated with transmission of the particular version of the audio prompt data 114 output via the sound card, and/or another type of identifier associated with the particular version of the audio prompt data 114. In various embodiments, the sound card data can be stored (e.g., previously stored) as at least a portion of the audio test data 105.

The data repository component 108 can store the sound card data in connection with the mobile device data 116 in the data repository 103. For example, the data repository component 108 can augment the audio test data 105 with the mobile device data 116 in connection with the sound card data. In one or more embodiments, the data repository component 108 can encode the mobile device data 116 (e.g., in connection with the sound card data) into the data repository 103. For example, the data repository component 108 can store and/or encode the mobile device data 116 in connection with the sound card identifier, the text to speech data, the volume data, the identifier data, and/or other sound card data in the data repository 103.

Figure 2:
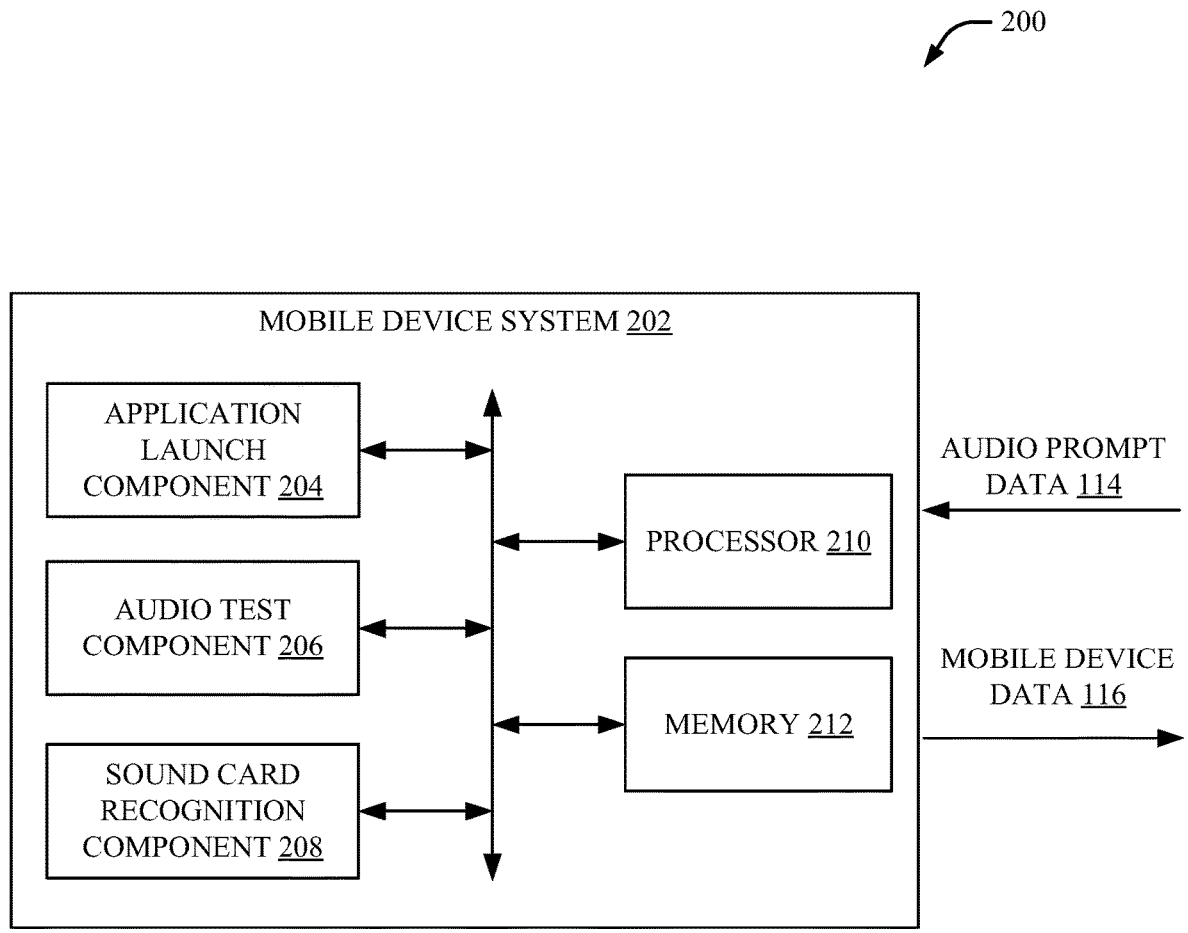
FIG. 2 illustrates an exemplary system for configuring audio for an audio test via a mobile device system, in accordance with one or more embodiments described herein.

FIG. 2 illustrates an exemplary embodiment of a system 200 within which one or more described features of one or more embodiments of the disclosure can be implemented. The system 200 includes a mobile device system 202. In one or more embodiments, the mobile device system 202 can be configured to perform one or more voice test automation processes to configure audio processing related to one or more workflow tasks. In various embodiments, the mobile device system 202 can be a mobile computing system integrated within a mobile device, a wearable device, a tablet device, an augmented realty device, a virtual reality device, and/or other type of device configured as a user audio device. In various embodiments, the mobile device system 202 can be capable of being communicatively coupled to the voice test system 102 and/or an execution device associated with the voice test system 102. In one or more embodiments, the mobile device system 202 can be associated with a WES, WMS, WCS, and/or another type of warehouse system associated with warehouse workflows, product distribution and tracking, product inventory management, etc.

The mobile device system 202 includes an application launch component 204, an audio test component 206 and/or a sound card recognition component 208. Additionally, in certain embodiments, the mobile device system 202 can include a processor 210 and/or a memory 212. In certain embodiments, one or more aspects of the mobile device system 202 (and/or other systems, apparatuses and/or processes disclosed herein) can constitute executable instructions embodied within a computer-readable storage medium (e.g., the memory 212). For instance, in an embodiment, the memory 212 can store computer executable component and/or executable instructions (e.g., program instructions). Furthermore, the processor 210 can facilitate execution of the computer executable components and/or the executable instructions (e.g., the program instructions). In an example embodiment, the processor 210 can be configured to execute instructions stored in the memory 212 or otherwise accessible to the processor 210.

The processor 210 can be a hardware entity (e.g., physically embodied in circuitry) capable of performing operations according to one or more embodiments of the disclosure. Alternatively, in an embodiment where the processor 210 is embodied as an executor of software instructions, the software instructions can configure the processor 210 to perform one or more algorithms and/or operations described herein in response to the software instructions being executed. In an embodiment, the processor 210 can be a single core processor, a multi-core processor, multiple processors internal to the mobile device system 202, a remote processor (e.g., a processor implemented on a server), and/or a virtual machine. In certain embodiments, the processor 210 can be in communication with the memory 212, the application launch component 204, the audio test component 206 and/or the sound card recognition component 208 via a bus to, for example, facilitate transmission of data among the processor 210, the memory 212, the application launch component 204, the audio test component 206 and/or the sound card recognition component 208. The processor 210 can be embodied in a number of different ways and can, in certain embodiments, include one or more processing devices configured to perform independently. Additionally, or alternatively, the processor 210 can include one or more processors configured in tandem via a bus to enable independent execution of instructions, pipelining of data, and/or multi-thread execution of instructions. The memory 212 can be non-transitory and can include, for example, one or more volatile memories and/or one or more non-volatile memories. In other words, for example, the memory 212 can be an electronic storage device (e.g., a computer-readable storage medium). The memory 212 can be configured to store information, data, content, one or more applications, one or more instructions, or the like, to enable the mobile device system 202 to carry out various functions in accordance with one or more embodiments disclosed herein.

The application launch component 204 can initiate a voice test automation process via in response to a connection being established between the mobile device system 202 and the voice test system 102. For example, the application launch component 204 can launch an application and/or the voice test automation process in response to a connection being established between the mobile device system 204 and the voice test system 102. The connection can be a wireless connection that communicatively couples the mobile device system 204 and the voice test system 102 via one or more wireless communication channels. The wireless connection can be associated with Bluetooth, NFC, or any other type of communication protocol. Alternatively, the connection can be a wired connection that communicatively couples the mobile device system 204 and the voice test system 102 via one or more wired communication channels. In various embodiments, the application launch component 204 can receive an execution device identifier to initiate the voice test automation process in response to establishing the connection with the mobile device system. The execution device identifier can correspond to the execution device associated with the voice test system 102. Additionally or alternatively, the application launch component 104 can receive one or more control signals to initiate the voice test automation process in response to establishing the connection with the execution device associated with the voice test system 102.

The audio test component 206 can be configured to manage the voice test automation process related to the voice test system 102. In various embodiments, the audio test component 206 can execute one or more subprocesses related to the voice test automation process. For example, the audio test component 206 can process audio prompt data 114 received via the respective sound cards integrated within the execution device associated with the voice tests system 102. The audio test component 206 can also be configured to recognize a particular version of the audio prompt data 114, a particular sound associated with the audio prompt data 114, a particular word associated with the audio prompt data 114, and/or a particular phrase associated with the audio prompt data 114. In response to recognition of the audio prompt data 114, the sound card recognition component 208 can generate and/or transmit the mobile device data 116. For example, the sound card recognition component 208 can be configured to generate and/or transmit a mobile device identifier associated with the mobile device system 202, an application identifier associated with the application executed via the mobile device system 202, a voice test identifier associated with a type of voice test related to the voice test automation process, and/or other data associated with the mobile device system 202. In various embodiments, the audio test component 206 can configure the mobile device system 202 as a voice system based on one or more portions of the audio test data 105. For example, the audio test component 206 can configure one or more audio waveforms for a voice system based on the sound card recognition component 208 and/or or more portions of the audio test data 105.

Figure 3:
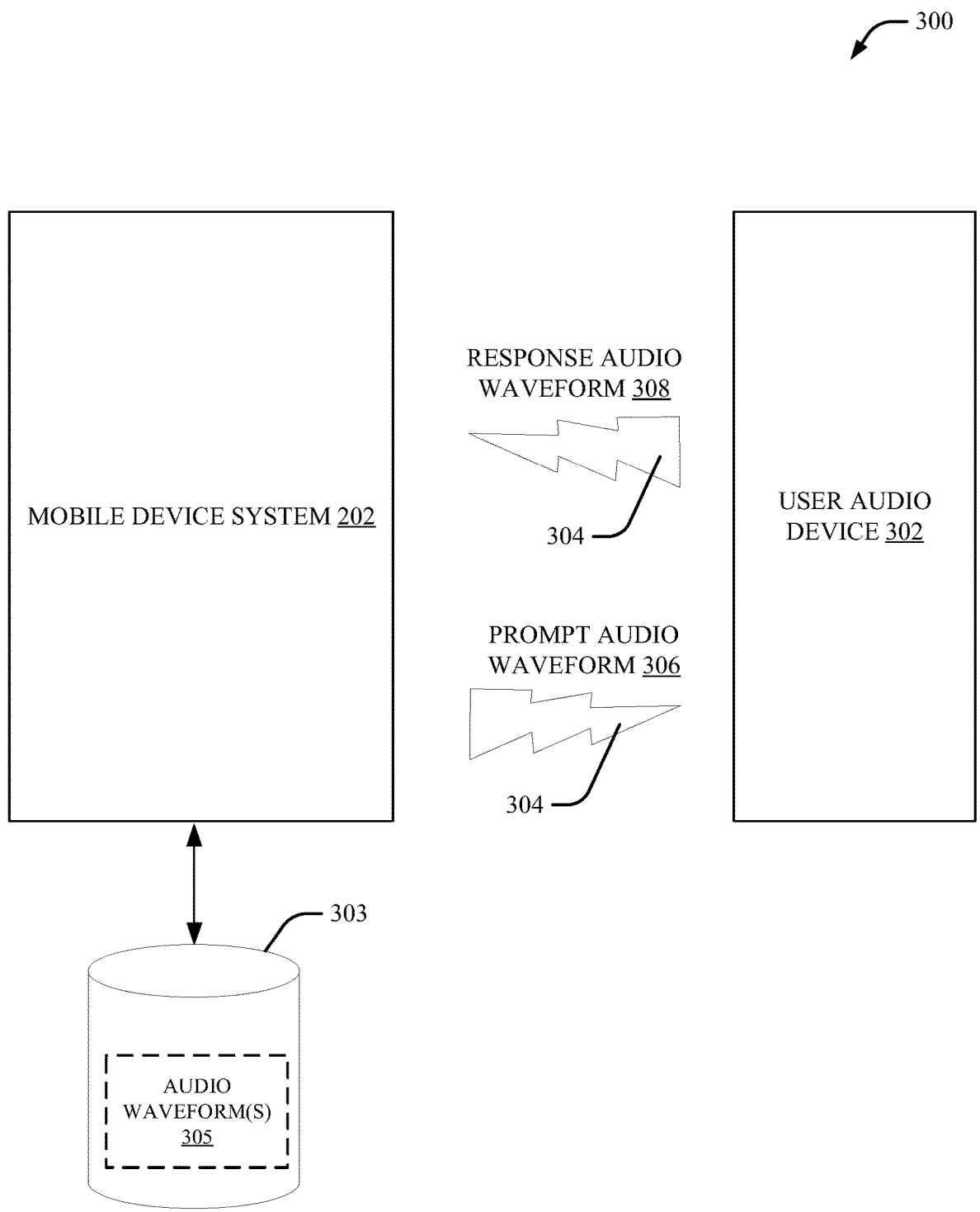
FIG. 3 illustrates an exemplary system that includes a mobile device system and a user audio device, in accordance with one or more embodiments described herein.

FIG. 3 illustrates an exemplary embodiment of a system 300 within which one or more described features of one or more embodiments of the disclosure can be implemented. The system 300 includes the mobile device system 202, a data repository 303, and a user audio device 302. The mobile device system 202 can be integrated with and/or can correspond to a mobile device, a smartphone, a voice solution device, a wearable device, a tablet device, an augmented realty device, a virtual reality device, and/or other type of computing device. In one or more embodiments, the user audio device 302 can be a wearable device. For example, in one or more embodiments, the user audio device 302 can be a headset device. In an embodiment, the mobile device system 202 can be integrated within a device separate from the user audio device 302. In another embodiment, both the mobile device system 202 and the user audio device 302 can be integrated within a mobile device, a smartphone, a voice solution device, a wearable device, a tablet device, an augmented realty device, a virtual reality device, and/or other type of device.

The user audio device 302 can be an audio input/output (I/O) device. In various embodiments, the user audio device 302 includes one or more microphones to capture one or more audio responses from a user and/or one or more speakers to provide one or more audio waveforms associated with one or more audio prompts. For example, the user audio device 302 can be configured with headphones, earpieces, earbuds, etc. that is worn on the head of a user (e.g., a worker) to present (e.g., play) one or more voice prompts and/or voice commands to the user. Additionally, the user audio device 302 can be configured with one or more microphones for generating voice responses to voice prompts and/or voice commands. Additionally or alternatively, in certain embodiments, the user audio device 302 includes a display to capture data associated with responses and/or to present data associated with prompts.

In various embodiments, the user audio device 302 can be configured with a voice-directed mobile terminal associated with a workflow management system. For example, the user audio device 302 can be configured as a voice-driven device associated with one or more speech interfaces to permit a user to communicate (e.g., using speech or voice) with the mobile device system 202. In certain embodiments, the user audio device 302 can be configured with speech-recognition technology to permit a user to communicate (e.g., using speech or voice) with the mobile device system 202. However, it is to be appreciated that, although exemplary embodiments presented herein incorporate voice-direction techniques, the present disclosure is not limited to speech-directed communications. For example, the user audio device 302 and/or the mobile device system 202 can be configured as another type of device and/or system that employs dialog, speech, text (e.g., through a keyboard or a display interface), gestures, or other communicative activity, with a user.

In various embodiments, the user audio device 302 can communicate with the mobile device system 202 via one or more communication channels 304. The one or more communication channels 304 can be one or more wired communication channels or one or more wireless communication channels. In certain embodiments, the one or more communication channels 304 can be a wired analog communication channel. In certain embodiments, the one or more communication channels 304 can be configured using Bluetooth, NFC, or any other type of communication protocol. In certain embodiments, the one or more communication channels 304 can be integrated within a mobile device, a smartphone, a voice solution device, a wearable device, a tablet device, an augmented realty device, a virtual reality device, and/or other type of computing device.

In one or more embodiments, the mobile device system 202 can provide a prompt audio waveform 306 to the user audio device 302 via a communication channel 304. The prompt audio waveform 306 can be associated with an audio prompt for a workflow task such as, for example, a warehouse workflow task. In various embodiments, the prompt audio waveform 306 can be a single prompt audio waveform from a series of prompt audio waveforms provided by the mobile device system 202. In certain embodiments, the prompt audio waveform 306 can corresponds to a candidate audio waveform selected from a set of audio waveforms 305 stored in a data repository 303. For example, in response to a determination that the prompt audio waveform 306 matches a response audio waveform 308 provided by the user audio device 302, the mobile device system 202 can transmit the prompt audio waveform 306 to the user audio device 302. The response audio waveform 308 can also be transmitted to the mobile device system 202 via a communication channel 304. In certain embodiments, the set of audio waveforms 305 stored in the data repository 303 and/or data transmitted between the mobile device system 202 and the user audio device 302 can be configured as TTS data or other audio data.

In various embodiments, the prompt audio waveform 306 can be stored in one or more data buffers as audio data to be heard by a user via the user audio device 302. In certain embodiments, the prompt audio waveform 306 can be configured as an audio file to be heard by a user via the user audio device 302. Additionally, the response audio waveform 308 can be stored in one or more data buffers and can includes voice data (e.g., speech data) provided by a user via the user audio device 302. For example, a user can execute one or more tasks associated with the prompt audio waveform 306 (e.g., the user can go to a designated location and picks a designated product or performs some other task). In certain embodiments, the response audio waveform 308 can be stored as a data file. Additionally, the user can provide audio content (e.g., a verification of a location and/or a product) and the user audio device 302 can convert the audio content into a particular data format (e.g., the response audio waveform 308) to be transmitted to the mobile device system 202. Accordingly, in a voice-directed or speech directed work context, a speech dialog (e.g., a workflow dialog) between the user audio device 302 and the mobile device system 202 can be provided to facilitate execution and/or completion of one or more tasks (e.g., one or more workflow tasks).

Figure 4:
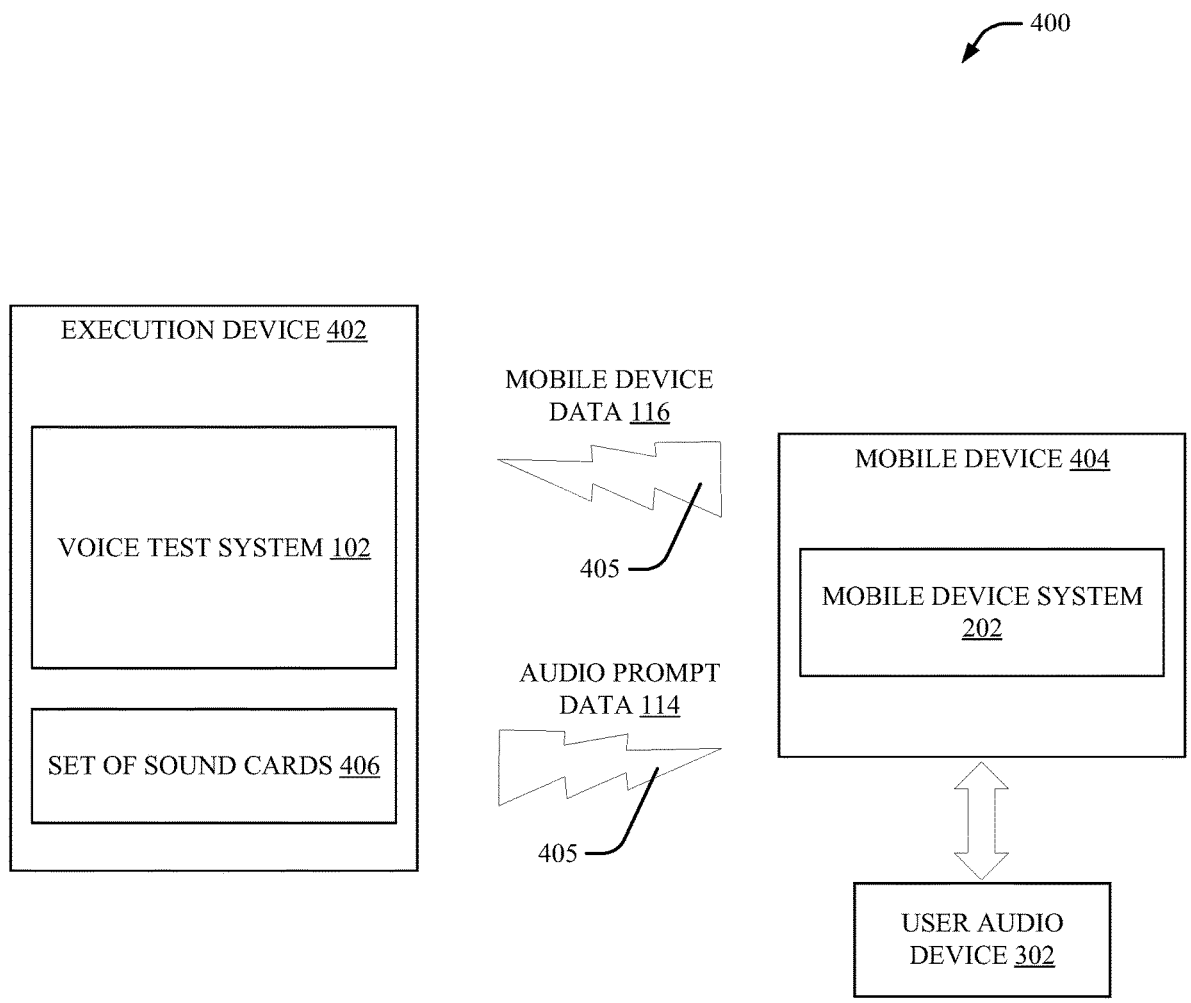
FIG. 4 illustrates an exemplary system that includes an execution device and a mobile device, in accordance with one or more embodiments described herein.

FIG. 4 illustrates an exemplary embodiment of a system 400 within which one or more described features of one or more embodiments of the disclosure can be implemented. The system 300 includes an execution device 402 and a mobile device 404. The execution device 402 includes and/or is communicatively coupled with the voice test system 102. The execution device 402 also includes a set of sound cards 406. The mobile device 404 includes and/or communicatively coupled with the mobile device system 202. The execution device 404 can be a personal computer, a laptop computer, a workstation computer, a server computer, or another type of execution device configured with the set of sound cards 406. The mobile device 404 can be a mobile device, a smartphone, a voice solution device, a wearable device, a tablet device, an augmented realty device, a virtual reality device, and/or other type of computing device. In various embodiments, the mobile device 404 can also be communicatively coupled and/or physically coupled to the user audio device 302. In various embodiments, the execution device 402 and the mobile device 404 can be located in a voice test automation lab environment.

In various embodiments, the execution device 402 can communicate with the mobile device 404 via one or more communication channels 405. The one or more communication channels 304 can be one or more wired communication channels or one or more wireless communication channels. In certain embodiments, the one or more communication channels 405 can be a wired analog communication channel. In certain embodiments, the one or more communication channels 405 can be configured using Bluetooth, NFC, or any other type of communication protocol. In one or more embodiments, the execution device 402 can provide the audio prompt data 114 to the mobile device 404 via a communication channel 405. For example, respective sound cards from the set of sound cards 406 can sequentially output the audio prompt data 114 in response to a connection being established between the mobile device 404 and the execution device 402. Additionally, in one or more embodiments, the mobile device 404 can provide the mobile device data 116 to the execution device 402 via a communication channel 405.

Figure 5:
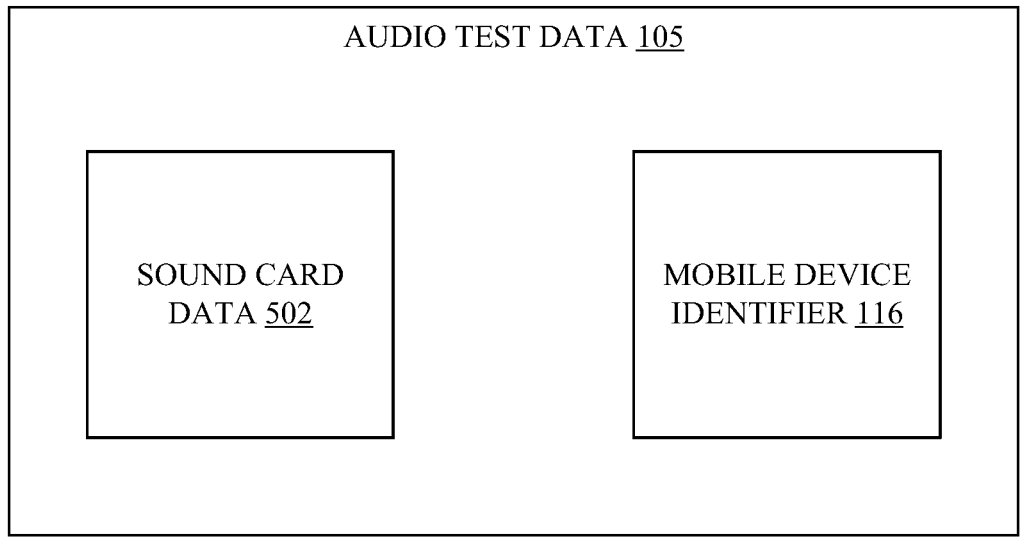
FIG. 5 illustrates exemplary audio test data, in accordance with one or more embodiments described herein.

FIG. 5 illustrates an exemplary embodiment of the audio test data 105 according to one or more embodiments of the disclosure. The audio test data 105 includes the mobile device data 116 correlated with a sound card data 502. For example, the sound card data 502 can correspond to information for a sound card from the set of sound cards 406 that transmits a particular version of the audio prompt data 114 recognized by the mobile device 404. Additionally, the mobile device identifier 504 can correspond to an identifier for a mobile device (e.g., the mobile device 404) that recognizes the particular version of the audio prompt data 114 and/or transmits the mobile device data 116 to the execution device 402. In various embodiments, the sound card data 502 and the mobile device identifier 116 can be encoded into a database such as the data repository 103. In various embodiments, a correlation between the sound card data 502 and the mobile device identifier 116 can be employed to configure a mobile device (e.g., the mobile device 404) and/or a voice system for the mobile device for providing workflow tasks to a user. For example, a correlation between the sound card data 502 and the mobile device identifier 116 can be employed for voice test automation for a voice system that facilitates workflow tasks for a user related to a mobile device.

The sound card data 502 can include a sound card identifier associated with a sound card from the set of sound cards 406, text to speech data associated with a particular version of audio prompt data output via the sound card, volume data associated with a particular version of audio prompt data output via the sound card, identifier data associated with a particular version of audio prompt data output via the sound card, and/or other data associated with the sound card. In one or more embodiments, the text to speech data can include at least a text to speech rate associated with a particular version of audio prompt data output via the sound card. In one or more embodiments, the volume level can include at least a volume level associated with a particular version of audio prompt data output via the sound card. In one or more embodiments, the identifier data can include a voice identifier for a digitized voice associated with a particular version of audio prompt data output via the sound card, a prompt identifier associated with a type of audio prompt for a particular version of audio prompt data 114 output via the sound card, an audio port identifier associated with transmission of a particular version of audio prompt data output via the sound card, and/or other information related to the sound card correlated with the mobile device identifier 116.

Figure 6:
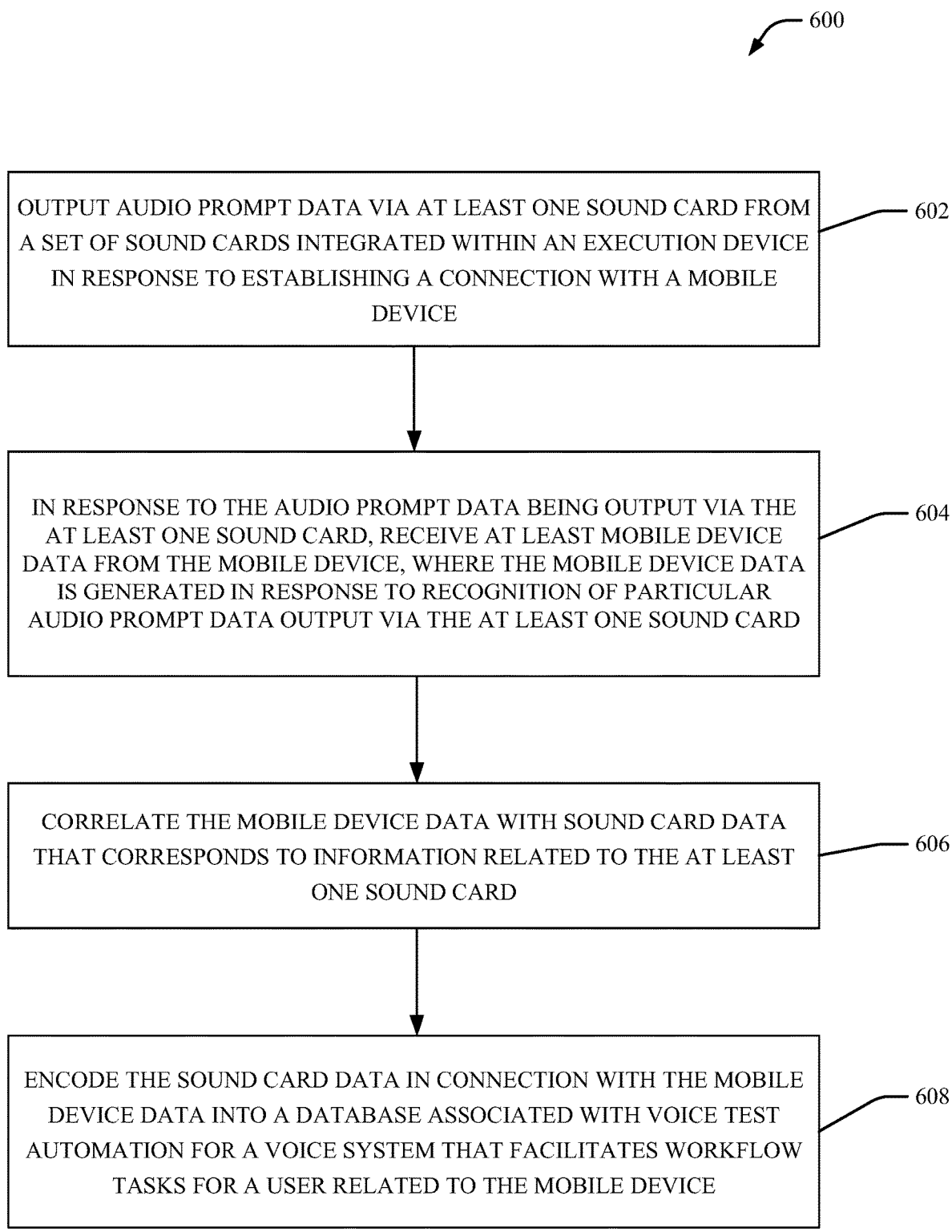
FIG. 6 illustrates a flow diagram for configuring audio for voice test system automation, in accordance with one or more embodiments described herein.

FIG. 6 illustrates a computer-implemented method 600 for configuring audio for voice test system automation in accordance with one or more embodiments described herein. In one or more embodiments, the computer-implemented method 600 can be executed by the voice test system 102. In one or more embodiments, the computer-implemented method 600 begins at step 602 for outputting audio prompt data via at least one sound card from a set of sound cards integrated within an execution device in response to establishing a connection with a mobile device. The computer-implemented method 600 also includes a step 604 for, in response to the audio prompt data being output via the at least one sound card, receiving at least mobile device data from the mobile device, where the mobile device data is generated in response to recognition of particular audio prompt data output via the at least one sound card. The computer-implemented method 600 also includes a step 606 for correlating the mobile device data with sound card data that corresponds to information related to the at least one sound card. The computer-implemented method 600 also includes a step 608 for encoding the sound card data in connection with the mobile device data into a database associated with voice test automation for a voice system that facilitates workflow tasks for a user related to the mobile device.

In certain embodiments, the outputting the audio prompt data can include sequentially outputting the audio prompt data via the respective sound cards from the set of sound cards in response to establishing the connection with a mobile device. In certain embodiments, the computer-implemented method 600 can additionally or alternatively include initiating a voice test automation process via the mobile device in response to establishing the connection with the mobile device. In certain embodiments, the computer-implemented method 600 can additionally or alternatively include transmitting an execution device identifier to the mobile device to initiate a voice test automation process via the mobile device in response to establishing the connection with the mobile device. In certain embodiments, the computer-implemented method 600 can additionally or alternatively include correlating the mobile device data with a sound card identifier associated with the at least one sound card. In certain embodiments, the computer-implemented method 600 can additionally or alternatively include storing the mobile device data in association with the sound card identifier in the database. In certain embodiments, the mobile device data can include a mobile device identifier associated with mobile device and the computer-implemented method 600 can additionally or alternatively include encoding the sound card data in connection with the mobile device identifier into the database.

Figure 7:
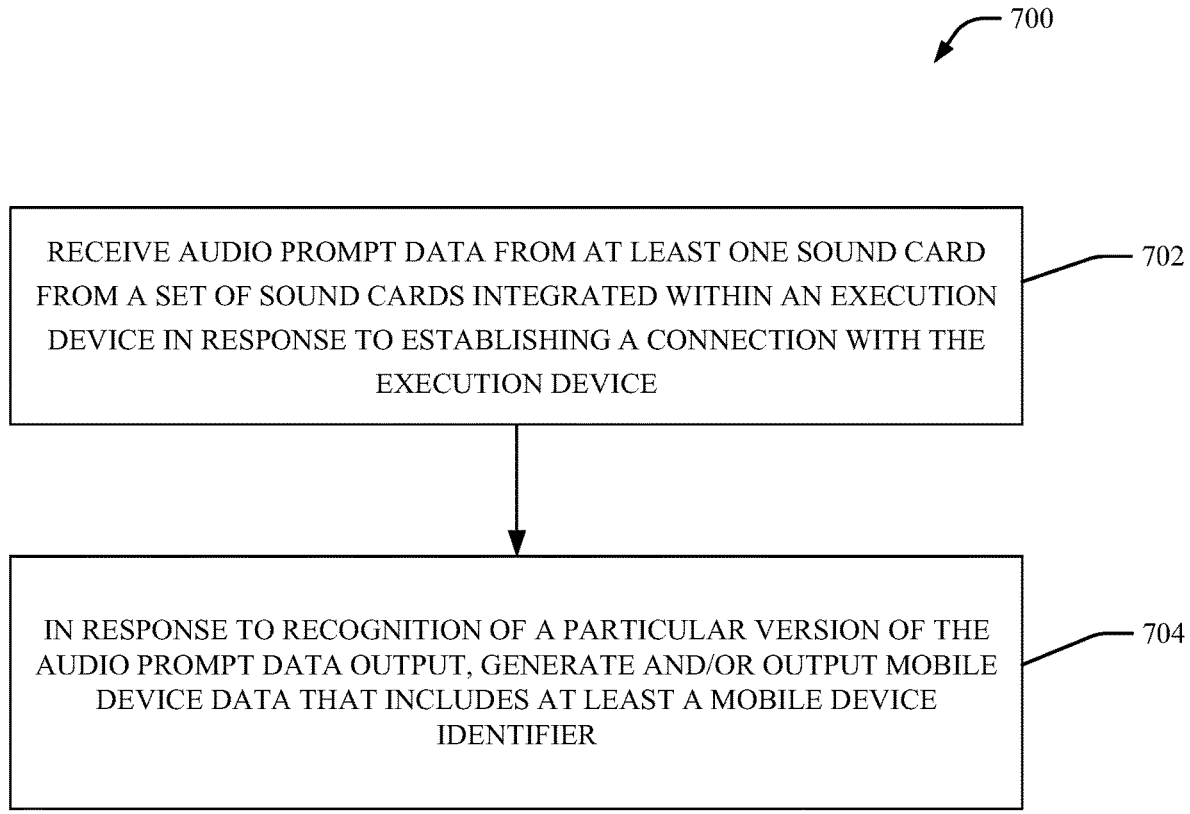
FIG. 7 illustrates another flow diagram for configuring audio for voice test system automation, in accordance with one or more embodiments described herein.

FIG. 7 illustrates a computer-implemented method 700 for configuring audio for voice test system automation in accordance with one or more embodiments described herein.

In one or more embodiments, the computer-implemented method 700 can be executed by the mobile device system 102. In one or more embodiments, the computer-implemented method 700 begins at step 702 for receiving audio prompt data from at least one sound card from a set of sound cards integrated within an execution device in response to establishing a connection with the execution device. The computer-implemented method 700 also includes a step 704 for, in response to recognition of a particular version of the audio prompt data output, generating and/or outputting mobile device data that includes at least a mobile device identifier.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-Ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system, comprising:
  a processor; and
  a memory that stores executable instructions that, when executed by the processor, cause the processor to:
    in response to establishing a connection with a mobile device, identify a sound card compatible with the mobile device by outputting audio prompt data via at least one sound card from a set of sound cards integrated within an execution device, wherein each sound card from the set of sound cards includes a sound card identifier;
    in response to the audio prompt data being output via the at least one sound card, receive at least mobile device data from the mobile device, wherein the mobile device data is generated in response to recognition of the audio prompt data outputted via the at least one sound card, wherein the mobile device data includes an identifier of the mobile device and an acknowledgement identifier, and wherein the at least one sound card corresponding to the audio prompt data recognized by the mobile device is indicative of the sound card compatible with the mobile device;
correlate the identifier of the mobile device with the sound card identifier associated with the at least one sound card; and
encode sound card data in connection with the mobile device data into a database associated with voice test automation for a voice system that facilitates workflow tasks for a user related to the mobile device, wherein the sound card data comprises the sound card identifier.

2. The system of claim 1, wherein the executable instructions further cause the processor to:
sequentially output the audio prompt data via respective sound cards from the set of sound cards in response to establishing the connection with the mobile device.

3. The system of claim 1, wherein the executable instructions further cause the processor to:
initiate a voice test automation process via the mobile device in response to establishing the connection with the mobile device.

4. The system of claim 1, wherein the executable instructions further cause the processor to:
transmit an execution device identifier to the mobile device to initiate a voice test automation process via the mobile device in response to establishing the connection with the mobile device.

5. The system of claim 1, wherein the executable instructions further cause the processor to:
correlate the mobile device data with a sound card identifier associated with the at least one sound card; and
store the mobile device data in association with the sound card identifier in the database.

6. The system of claim 1, wherein the sound card data comprises text to speech data associated with the audio prompt data outputted via the at least one sound card, and wherein the executable instructions further cause the processor to:
encode the text to speech data in connection with the mobile device data into the database.

7. The system of claim 1, wherein the sound card data comprises a text to speech rate associated with the audio prompt data outputted via the at least one sound card, and wherein the executable instructions further cause the processor to:
encode the text to speech rate in connection with the mobile device data into the database.

8. The system of claim 1, wherein the sound card data comprises a volume level associated with the audio prompt data outputted via the at least one sound card, and wherein the executable instructions further cause the processor to:
encode the volume level in connection with the mobile device data into the database.

9. The system of claim 1, wherein the sound card data comprises a voice identifier for a digitized voice associated with the audio prompt data outputted via the at least one sound card, and wherein the executable instructions further cause the processor to:
encode the voice identifier in connection with the mobile device data into the database.

10. The system of claim 1, wherein the sound card data comprises a prompt identifier associated with a type of audio prompt for the audio prompt data outputted via the at least one sound card, and wherein the executable instructions further cause the processor to:
encode the prompt identifier in connection with the mobile device data into the database.

11. The system of claim 1, wherein the mobile device data comprises a mobile device identifier associated with the mobile device, and wherein the executable instructions further cause the processor to:
encode the sound card data in connection with the mobile device identifier into the database.

12. The system of claim 1, wherein the mobile device data comprises audio response data associated with the mobile device, and wherein the executable instructions further cause the processor to:
encode the sound card data in connection with the audio response data into the database.

13. A method, comprising:
identifying a sound card compatible with a mobile device by outputting audio prompt data via at least one sound card from a set of sound cards integrated within an execution device in response to establishing a connection with the mobile device, wherein each sound card from the set of sound cards includes a sound card identifier;
in response to the audio prompt data being output via the at least one sound card, receiving at least mobile device data from the mobile device, wherein the mobile device data is generated in response to recognition of the audio prompt data outputted via the at least one sound card, wherein the mobile device data includes an identifier of the mobile device and an acknowledgement identifier, and wherein the at least one sound card corresponding to the audio prompt data recognized by the mobile device is indicative of the sound card compatible with the mobile device;
correlating the identifier of the mobile device with the sound card identifier associated with the at least one sound card; and
encoding sound card data in connection with the mobile device data into a database associated with voice test automation for a voice system that facilitates workflow tasks for a user related to the mobile device, wherein the sound card data comprises the sound card identifier.

14. The method of claim 13, wherein the outputting the audio prompt data comprises sequentially outputting the audio prompt data via respective sound cards from the set of sound cards in response to establishing the connection with the mobile device.

15. The method of claim 13, further comprising:
initiating a voice test automation process via the mobile device in response to establishing the connection with the mobile device.

16. The method of claim 13, further comprising:
transmitting an execution device identifier to the mobile device to initiate a voice test automation process via the mobile device in response to establishing the connection with the mobile device.

17. The method of claim 13, further comprising:
correlating the mobile device data with the sound card identifier associated with the at least one sound card; and
storing the mobile device data in association with the sound card identifier in the database associated with voice test automation.

18. The method of claim 13, wherein the mobile device data comprises a mobile device identifier associated with mobile device, and the method further comprising:

encoding the sound card data in connection with the mobile device identifier into the database associated with voice test automation.

19. The method of claim 13, wherein the sound card data comprises text to speech data associated with the audio prompt data outputted via the at least one sound card, and the method further comprising:
encoding the text to speech data in connection with the mobile device data into the database associated with voice test automation.

20. A computer program product comprising at least one non-transitory computer-readable storage medium having program instructions embodied thereon, the program instructions executable by a processor to cause the processor to:
in response to establishing a connection with a mobile device, identify a sound card compatible with the mobile device by outputting audio prompt data via at least one sound card from a set of sound cards integrated within an execution device, wherein each sound card from the set of sound cards includes a sound card identifier;

in response to the audio prompt data being output via the at least one sound card, receive at least mobile device data from the mobile device, wherein the mobile device data is generated in response to recognition of the audio prompt data outputted via the at least one sound card, wherein the mobile device data includes an identifier of the mobile device and an acknowledgement identifier, and wherein the at least one sound card corresponding to the audio prompt data recognized by the mobile device is indicative of the sound card compatible with the mobile device;

correlate the identifier of the mobile device with the sound card identifier associated with the at least one sound card; and encode sound card data in connection with the mobile device data into a database associated with voice test automation for a voice system that facilitates workflow tasks for a user related to the mobile device, wherein the sound card data comprises the sound card identifier.

* * * * *